United States Patent [19]

Bedner

[11] Patent Number: 5,195,722
[45] Date of Patent: Mar. 23, 1993

[54] FOOL PROOF SLIDE GATE VALVE

[76] Inventor: Michael P. Bedner, 33 Circle Dr., Monessen, Pa. 15062

[21] Appl. No.: 538,009

[22] Filed: Jun. 14, 1990

[51] Int. Cl.⁵ .............................................. F16K 3/18
[52] U.S. Cl. ..................................... 251/199; 251/196
[58] Field of Search ................ 251/195, 196, 197, 199

[56] References Cited

U.S. PATENT DOCUMENTS

| 750,128 | 1/1904 | Schneider | 251/199 |
|---|---|---|---|
| 2,204,142 | 6/1940 | MacClatchie | 251/196 X |
| 2,306,490 | 12/1942 | Noble | 251/196 X |
| 2,601,304 | 6/1952 | Lane | 251/199 |
| 2,705,610 | 4/1955 | Hjulian | 251/196 X |
| 2,906,491 | 9/1959 | Young | 251/197 X |

FOREIGN PATENT DOCUMENTS

| 1962121 | 6/1971 | Fed. Rep. of Germany | 251/197 |
|---|---|---|---|
| 867647 | 5/1961 | United Kingdom | 251/197 |

Primary Examiner—John C. Fox

[57] ABSTRACT

A fool proof slide gate valve wherein a slide gate valve body houses a gate which is constructed to encompass a wedge and its related components whereby when an external force is transmitted to said wedge, the gate effectively opens flow or closes flow to a medium flowing through a conduit connected to said fool proof slide gate valve, during which time of operation the gate remains sealed at all times preventing exposure of the component parts to the medium flowing through the conduit and other environmental matter and debris.

6 Claims, 4 Drawing Sheets

FOOL PROOF SLIDE GATE VALVE

BACKGROUND OF THE INVENTION

1. Field of the Invention

This invention relates to an improved gate valve that prevents the seats from sticking or becoming distorted by remaining firmly sealed, whether the valve is in the open-flow or closed-flow position. The present invention is typically utilized in pipelines like those in power plants where pulverized coal traverses to a boiler. Previous to this invention, the pulverized coal would back into portions of the gate valve and/or the slots where it rested causing same to malfunction. The present invention indicates two sections of body and two sections of gate which join together. Inside the gate section, there is a wedge-shaped part with rollers for easy sliding which is connected to a driving mechanism.

2. Description of the Prior Art

Previous gate valves like Doster U.S. Pat. No. 2,711,877, however effective, allow the medium which may be a fluid, gas, ash, or other type of solid to enter into various parts of the mechanism causing the valve to frequently stick. Doster is a typical gate valve utilizing a conduit member which aligns with the inlet and outlet ports for an open-flow position. However, in the process of opening and closing the gate, the medium readily seeps into the rollers and other parts requiring continued maintenance and creating an unsafe and hazardous condition.

A second example is Wheatley U.S. Pat. No. 4,314,579 which also uses typical components including a conduit, inlet and outlet ports and a valve seat located on the upstream side of the gate. It also encounters the same type of problems as Doster.

Erwin U.S. Pat. No. 4,405,113 utilizes a valve body consisting of three (3) sections with the intermediate section including a gate chamber in which a gate is placed and controlled through a drive stem member. Erwin also uses camming surfaces in cooperation with rollers to place outward forces on the seal. The typical gate conduit aligns with flow passageways in the valve body permitting the necessary flow.

Doster, Wheatley and Erwin all disclose slide gate valves in which the gate is formed in two sections or more. Doster and Wheatley use a wedge and Doster and Erwin use rollers. However, construction of these prior patents is more complex and thus more expensive to produce, yet the valves do not work as smoothly, effectively and do not provide the necessary protection to the inner-working mechanism of the gate.

U.S. Pat. Bohnhardt No. 1,803,889, Knox No. 2,952,437 and Husted No. 4,573,660 are of general interest and indicate typical gate valves.

SUMMARY OF THE INVENTION

It is, therefore, an object of the present invention to provide a fool proof slide gate valve which will not stick upon opening and closing thereof due to the excessive forces exerted on the seat and one that will be more precisely controllable during operation.

It is further the object of this invention to make available a slide gate valve that does protect the seats from distortion.

It is further the object of this invention to provide a slide gate valve that meshes perfectly on the seat disallowing substances and debris from entering the mechanism.

It is further the object of this invention to enclose a wedge member inside the gate which provides improved protection thereof from substances, debris, and the medium flowing across the gate.

It is further the object of this invention to offer a slide gate valve that can be manufactured inexpensively without the need for high-cost machining and a complexity of unnecessary parts.

It is further the object of this invention to offer a slide gate valve that is very safe during its operation because it does not accumulate debris in its inner components which has caused numerous sticking problems in prior gate valves.

More specifically, the present invention is a fool proof slide gate valve comprising a body having axially opposed body port cavities on a horizontal axis enabling a medium to flow freely, including a seat means secured to an inner circumferential side of said body port cavities; a gate means located within said body on a vertical axis, said gate means enclosing and protecting a wedge member which is mounted to a valve stem, said valve stem operated by a drive means on said vertical axis, said drive means transmits a force to said wedge member reciprocating said gate means between an open-flow position and a closed-flow position, said open-flow position occurs when said gate means is driven vertically upward enabling a gate port cavity corresponding in size and shape to said body port cavities to align with said body port cavities, said closed-flow position occurs when said gate means is driven vertically downward enabling a gate means outer surface to align with said body port cavities, said open-flow position and said closed-flow position occurring in cooperation with said seat means which remains in contact with said gate means outer surface at an inlet body port cavity and an outlet body port cavity, comprising said body port cavities.

These objects, as well as the other objects and advantages of the present invention, will become apparent from the following description, in reference to the illustrations appended hereto.

BRIEF DESCRIPTION OF THE DRAWINGS

For a better understanding of the invention, reference may be had to the accompanying drawings, in which.

DESCRIPTION OF PREFERRED EMBODIMENTS

Figure 1:
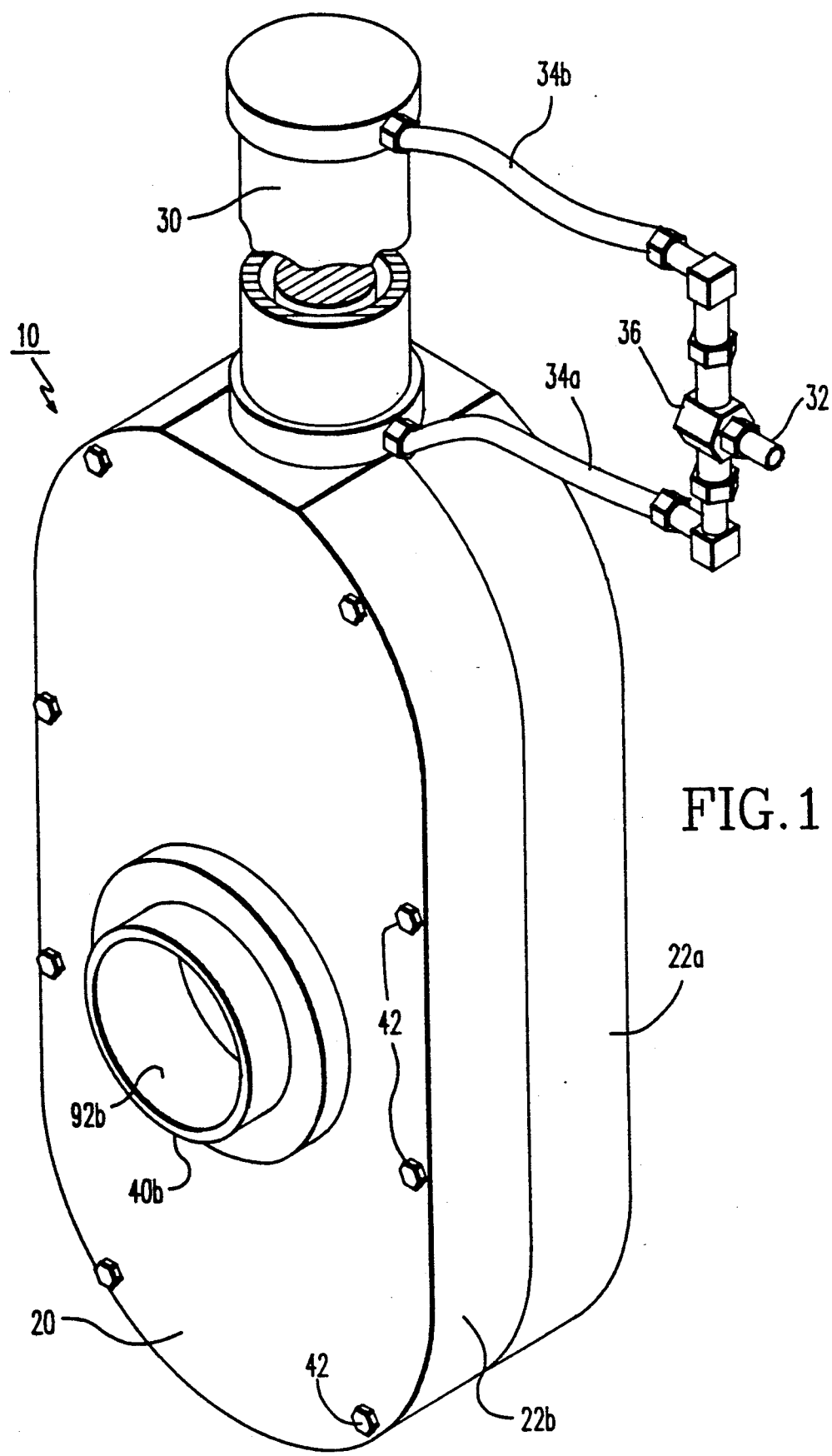
FIG. 1 represents an isometric view of the fool proof slide gate valve being the present invention.
Figure 2:
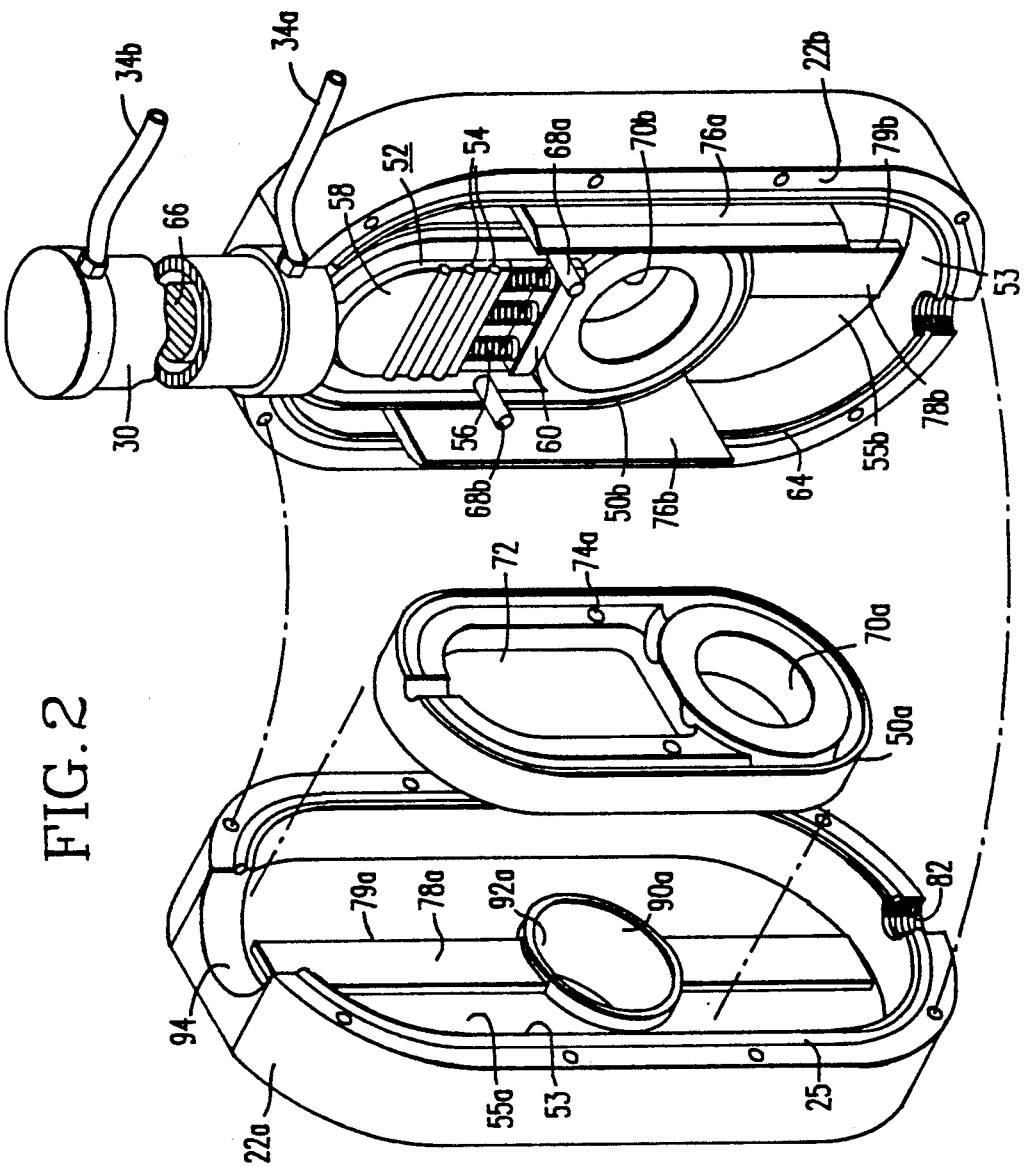
FIG. 2 represents an isometric view of the fool proof slide gate valve disassembled for viewing of its chief components.
Figure 3:
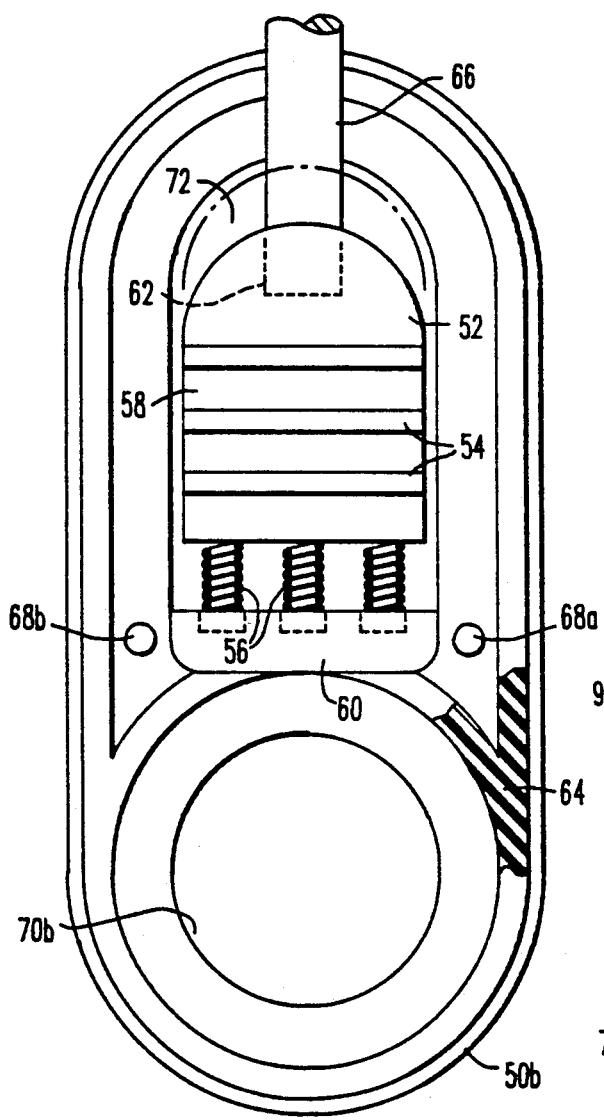
FIG. 3 represents a front elevational view of a left gate half.
Figure 4:
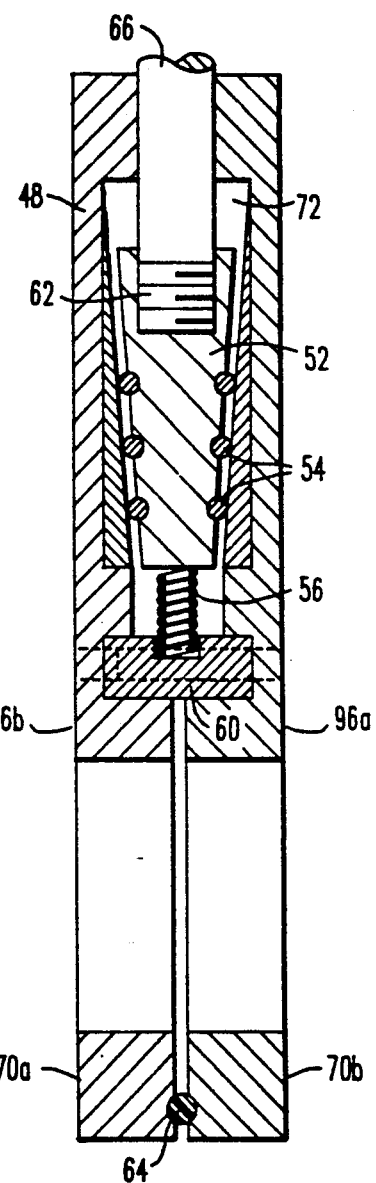
FIG. 4 represents a side cross-sectional view of a gate member including a right gate half and a left gate half section.
Figure 5:
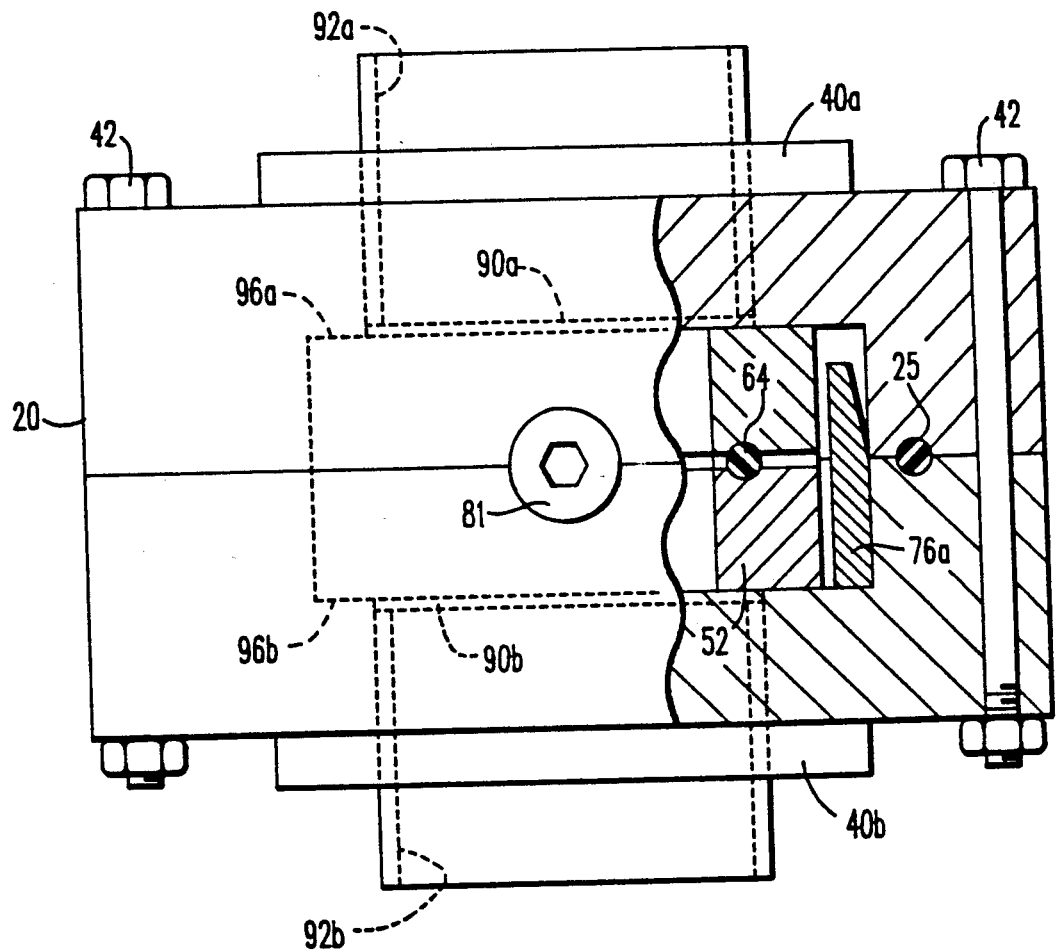
FIG. 5 represents a bottom view of the fool proof slide gate valve with partial cut-out section.

With reference to FIGS. 1 through 5, there is shown the fool proof slide gate valve 10 of the present invention. Fool proof slide gate valve 10 comprises slide gate valve body 20 having thereto a right outside flange half section 22a and a left outside flange half section 22b fastened by bolts 42 or any other substantial fastening means and sealed by body sealing means 25. This particular embodiment indicates a pneumatic air cylinder 30 which activates a gate member 48, although other pressurized mechanisms may be used effectively to accomplish the same result. The pneumatic air cylinder 30 is supplied through a main line 32 leading to a pneumatic control valve 36 which is preferably a four-way valve capable of opening and closing open position air line 34a and closed position air line 34b and further being capable of releasing air to the atmosphere as it returns from pneumatic air cylinder 30.

Inlet pipe flange 40b is generally connected to an inlet conduit (not shown) where a medium generally flows through fool proof slide gate valve 10. Likewise, outlet pipe flange 40a is generally connected to an outlet conduit (not shown) where the medium generally flows from fool proof slide gate valve 10. Opposing inlet pipe flange 40b, located inside gate cavity 53, is left seat member 90b for sealing against gate member 48. Opposing outlet pipe flange 40a, located inside gate cavity 53, is right seat member 90a for sealing against gate member 48. Right gate half section 50a is fastened to left gate half section 50b to form gate member 48. Gate sealing means 64 insures the protection of wedge member 52 in wedge cavity 72. Gate member 48 is further strengthened by use of right dial pin 68a which slides into right dial cavity 74a and left dial pin 68b which likewise slides into left dial cavity 74b. Any number of fastening means are acceptable including bonding by weld, high strength glues, bolts, set screws and these fastening means would coordinate and depend upon the materials selected to construct fool proof slide gate valve 10. Preferred materials are pressed steel, cast steel, cast iron, but in some applications like chemicals and gases, plastic would be more acceptable.

Compressed air in pneumatic air cylinder 30 transmits a vertical force through valve stem 66 to wedge member 52 which drives gate member 48 up or down to an open-flow position or a closed-flow position. Wedge member 52 is allowed to move freely in wedge cavity 72 by use of roller means 54 resultant in securing gate member 48 tightly to right seat member 90a and left seat member 90b. Specifically, right gate means outer surface 96a remains secure against right seat member 90a and left gate means outer surface 96b remains secure against left seat member 90b at all times of operation. Spring means 56 is mounted between main wedge member section 58 and spring hold member section 60 which offer a cushioning effect to the opening and closing operation.

Valve stem 66 is secured to wedge member 52 through threaded cavity 62 and to a piston (not shown) located in pneumatic air cylinder 30. Pneumatic air cylinder 30 secures into pneumatic air cylinder slot 94 of slide gate valve body 20. Proper vertical movement of gate member 48 is insured by right vertical gate guide 78a which consists of a right key 79a located on the center line of right gate cavity surface 55a. Similarly, left vertical gate guide 78b consists of left key 79b located on the center line of left gate cavity surface 55b. Precise vertical movement of gate member 48 is further insured by right gate guide 76a and left gate guide 76b which form around the outside of gate member 48.

Plug 81 fits into plug cavity 82 of slide gate valve body 20 and may be removed in order to manually release gate member 48 in the event sticking occurs.

When fool proof slide gate valve 10 is in the open-flow position, a medium will generally flow from the left to the right thereof, that is through inlet body port cavity 92b located in left outside flange half section 22b and then through inlet gate port cavity 70b, onward through outlet gate port cavity 70a and then through outlet body port cavity 92a.

In accordance with the provisions of the patent statutes, I have explained the principal and operation of my invention and have illustrated and described what I consider to represent the best embodiment thereof.

I claim:

1. A fool proof slide gate valve comprising:
   a body having axially opposed body port cavities on a horizontal axis enabling a medium to flow freely, including a seat means secured to an inner circumferential side of said body port cavities;
   a gate means located within said body on a vertical axis, said gate means enclosing and protecting by a resilient seal member a wedge member which is mounted to a valve stem, said valve stem operated by a drive means on said vertical axis, said drive means transmits a force to said wedge member reciprocating said gate means between an open-flow position and a closed-flow position, said open-flow position occurs when said gate means is driven vertically upward enabling a gate port cavity corresponding in size and shape to said body port cavities to align with said body port cavities, said closed-flow position occurs when said gate means is driven vertically downward enabling a gate means outer surface to align with said body port cavities, said open-flow position and said closed-flow position occurring in cooperation with said seat means which remains in contact with said gate means outer surface at an inlet body port cavity and an outlet body port cavity, comprising said body port cavities.

2. A fool proof slide gate valve according to claim 1, wherein said wedge member located inside a gate cavity receives a vertical force transmitted through said valve stem causing said gate means to seal tightly to said seat means when said gate means is in said closed-flow position.

3. A fool proof slide gate valve according to claim 1, wherein said wedge member comprises antifriction roller members interposed between a first wedge surface and a first inner gate means surface and respectively an opposing second wedge surface and a second inner gate means surface; said wedge member comprising a spring means connecting said wedge member and a spring hold member for ease of engagement of said gate means to said seat means.

4. A fool proof slide gate valve comprising:
   a body having axially opposed body port cavities on a horizontal axis enabling a medium to flow freely, including a seat means secured to an inner circumferential side of said body port cavities;
   a gate means located within said body on a vertical axis, said gate means enclosing and protecting by a resilient seal member a wedge member which is mounted to a valve stem, said valve stem operated by a drive means on said vertical axis, said drive means transmits a force to said wedge member reciprocating said gate means between an open-flow position and a closed-flow position, said open-flow position occurs when said gate means is driven vertically upward enabling a gate port cavity corresponding in size and shape to said body port cavities to align with said body port cavities, said closed-flow position occurs when said gate means is driven vertically downward enabling a gate means outer surface to align with said body port cavities, said open-flow position and said closed-flow position occurring in cooperation with said seat means which remains in contact with said gate means outer surface at an inlet body port cavity and an outlet body port cavity, comprising said body port cavities;

wherein said wedge member located inside a gate cavity receives a vertical force transmitted through said valve stem, causing said gate means to seal tightly to said seat means when said gate means is in said closed-flow position;

wherein said wedge member comprises antifriction roller members interposed between a first wedge surface and a first inner gate means surface and respectively an opposing second wedge surface and a second inner gate means surface; said wedge member comprising a spring means connecting said wedge member and a spring hold member for ease of engagement of said gate means to said seat means.

5. A fool proof slide gate valve according to claim 4, wherein said gate means consists of a right gate half section secured by a gate fastening means to a left gate half section forming therein a wedge cavity.

6. A fool proof slide gate valve according to claim 5, wherein said gate fastening means consists of a plurality of dial cavities set in said right gate half section and a multitude of coordinating dial pins located on said left gate half section, such that by fitting said right gate half section to said left gate half section, said dial pins fit into said dial cavities over a gate sealing means, said gate means acting in a first capacity to protect said wedge member from environmental factors, debris, fluids, gases, and other external matter and in a second capacity to maintain tension against said seat means.

* * * * *